United States Patent [19]
Smith et al.

[11] Patent Number: 5,549,843
[45] Date of Patent: Aug. 27, 1996

[54] ANNEALED ALKALINE EARTH METAL FLUOROHALIDE STORAGE PHOSPHOR, PREPARATION METHOD, AND RADIATION IMAGE STORAGE PANEL

[75] Inventors: Kyle E. Smith, Victor; Joseph F. Bringley, Rochester; Patrick M. Lambert, Rochester; David P. Trauernicht, Rochester; Philip S. Bryan, Webster; Paul M. Hoderlein, Rochester; Andrea M. Hyde, Hamlin, all of N.Y.

[73] Assignee: Eastman Kodak Company, Rochester, N.Y.

[21] Appl. No.: 342,975

[22] Filed: Nov. 21, 1991

[51] Int. Cl.$^6$ .................................................. C09K 11/61
[52] U.S. Cl. ................................ 252/301.4 H; 250/484.4
[58] Field of Search .................. 252/301.4 H; 230/484.4

[56] References Cited

U.S. PATENT DOCUMENTS

| | | | |
|---|---|---|---|
| 2,502,529 | 4/1950 | Murray | 95/8 |
| 2,887,379 | 5/1959 | Blake et al. | 95/8 |
| 3,300,310 | 1/1967 | Kennard et al. | 96/82 |
| 3,300,311 | 1/1967 | Kennard et al. | 96/82 |
| 3,617,285 | 11/1969 | Staudenmayer | 250/80 |
| 3,743,833 | 7/1973 | Martic et al. | 250/483 |
| 4,380,702 | 4/1983 | Takahashi et al. | 250/327.2 |
| 4,491,736 | 1/1985 | Teraoka | 250/484 |
| 4,505,989 | 3/1985 | Umemoto et al. | 428/691 |
| 4,912,333 | 3/1990 | Roberts et al. | 250/487.1 |
| 5,028,509 | 7/1991 | Shimada et al. | 252/301.4 H |
| 5,227,254 | 7/1993 | Brixner et al. | 428/691 |

FOREIGN PATENT DOCUMENTS

142734A1 5/1985 European Pat. Off. .
56-011392 2/1981 Japan .

OTHER PUBLICATIONS

*Research Disclosure*, vol. 154, Feb. 1977, No. 15444.
*Research Disclosure*, vol. 176, Dec. 1978, No. 17643, Section XVII.
*Research Disclosure*, vol. 184, Aug. 1979, No. 18431, Section I.
R. Eachus et al. *J. Phys. Condensed Matter*, vol. 3 (1991), pp. 9327–9338.

*Primary Examiner*—Melissa Bonner
*Attorney, Agent, or Firm*—Robert Luke Walker

[57] ABSTRACT

A method, a storage phosphor prepared by the method, and a storage panel. In the method, a precursor mixture is fired, at a temperature between 700° C. and the melting point of the phosphor, to produce an intermediate product. The precursor mixture comprises a combination of species characterized by the relationship:

$$MFX_{1-x}I_z \cdot uM^aX^a : yA : eQ$$

wherein M is selected from Mg, Ca, Sr and Ba; X is selected from Cl and Br; $M^a$ is selected from Na, K, Rb and Cs; $X^a$ is selected from F, Cl, Br and I; A is selected from Eu, Ce, Sm, and Tb; Q is metal oxide; and $0<z\leq 1$; $0<u<1$; $0<y\leq 0.1$; and $0<e<0.1$. The intermediate product is then annealed in a slightly oxidizing atmosphere, at a temperature, which is lower than said temperature of firing and between about 400° C. and about 800° C., for a time sufficient to reduce the erase fraction of the resulting phosphor relative to the same phosphor produced by firing in the same manner, but not annealing.

22 Claims, No Drawings

ANNEALED ALKALINE EARTH METAL FLUOROHALIDE STORAGE PHOSPHOR, PREPARATION METHOD, AND RADIATION IMAGE STORAGE PANEL

FIELD OF THE INVENTION

The invention relates to radiation image storage phosphors, preparation methods, and radiation image storage panels. The invention more particularly relates to an annealed alkaline earth metal fluorohalide phosphor, preparation method, and storage panel, that provide improved erasability yet high photostimulated luminescence.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible or near visible (i.e., UV or IR) light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible or near visible light from irradiated phosphor crystals.

X-ray storage phosphors and image storage panels are characterized by a number of properties including sensitivity, resolution and noise. It is generally desired that the sensitivity or the photostimulated luminescence of the panel be made as high possible to decrease the exposure dose for the patient while maintaining high image quality. Additionally, X-ray storage phosphors and image storage panels are characterized by several other properties including dark-decay; the ability of the phosphor or panel to retain the signal (image) over time, and erasability; the ease with which the image may be removed so that a new image can be "written" on the screen.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

In the aforementioned radiation image recording and reproducing method, after the patient is exposed and the image is detected and read, it is necessary to remove or "erase" the image from the panel so that the panel can be reused to collect further images. If the image is not completely erased a problem arises in that subsequent images are degraded by excessive noise and/or by "ghost" images. Japanese Patent Provisional Publication No. 56(1980)-11392 discloses a method for erasing the stored energy which comprises exposing the panel to light having a wavelength within the region of stimulation wavelength of the stimulable phosphor. The erase step is performed prior to the panels reuse. The erasability of a phosphor or panel can be expressed as the "erase fraction". This is a dimensionless value that represents, for specified conditions, the residual luminescence of a storage phosphor after erasure, in proportion to the stimulated luminescence of the phosphor. It is desired that a stimulable phosphor employed in a storage panel have high erasability, that is, that the decay of stimulated emission is as fast as possible upon exposure to light having a wavelength within or near the region of stimulation.

The phosphors of the present invention are derived from the family of barium fluorohalide storage phosphors. Barium fluorohalide storage phosphors are commercially used as X-ray sensors and/or image storage devices in computed (or digital) radiography. The halide utilized is typically bromide, or a combination of bromide and iodide with europium as the activator, e.g., $BaFBr_{1-z}I_z$:Eu.

Alkaline earth metal fluoro-halide storage phosphors are described in a number of patent publications. European Patent Application No. 0142734 A1 teaches a phosphor described by the formula:

$$BaF(Br_{1-z}I_z):yEu^{2+}$$

This application states that . . . "the phosphor containing three kinds of elements of fluorine, bromine and iodine as halogen which is a host component of the phosphor is prominently enhanced in the luminance of stimulated emission. The radiation image recording and reproducing method employing said stimulable phosphor can be remarkably enhanced in the sensitivity."

U.S. Pat. No. 4,505,989, to Umemoto et al., discloses a storage phosphor like the phosphor of formula (I), that is coactivated with a transition metal, and has improved erasability and photostimulated luminescence. The patent indicates improvements in relative erasing time of 1 to 30 percent upon inclusion of a transition metal into the phosphor of formula (I). The phosphor is prepared by firing precursors:

"[T]he mixture of the starting materials for the phosphor is placed in a heat-resistant container such as a quartz boat, an alumina crucible or a quartz crucible, and fired in an electric furnace. The temperature for the firing suitably ranges from 600° C. to 1000° C. The firing period is determined depending upon the amount of the mixture of the starting materials charged into the heat resistant container, the firing temperature, etc., and generally ranges from 0.5 to 12 hours. As the firing atmosphere, there can be employed a weak reducing atmosphere such as a nitrogen gas atmosphere containing a small amount of hydrogen gas or a carbon dioxide gas atmosphere containing carbon monoxide gas.

The product obtained by firing conducted under the above-mentioned condition is taken out of the furnace, allowed to stand for cooling, and pulverized. The pulverized product may be again placed in the heat-resistant container and fired in the electric furnace. In the second firing, the temperature of the firing suitably ranges from 500° to 800° C. and the firing period suitably ranges from 0.5 to 12 hours. For carrying out the second firing, there can be employed an inert atmosphere such as a nitrogen gas atmosphere or an argon gas atmosphere, as well as the above-mentioned weak reducing atmosphere." (column 6)

The phosphor is then processed and coated according to various procedures well known in the art to form an image storage panel.

U.S. Pat. No. 5,227,254, to Brixner et al., discloses:

"a europium-doped barium fluorohalide photostimulable phosphor of the formula:

$$Ba_{1-x}Eu_xFBr_{1-2y}O_y\emptyset_y$$

wherein Ø represents an anion vacancy, x is about 0.001 to about 0.05, and y is about 0.0001 to about 0.01; the amount of oxygen vacancies effective to substantially increase the stored photostimulable energy, compared to a non-oxygen-treated phosphor."

The phosphor of this patent is obtained by heating a phosphor precursor at about 900° C. in a stream of nitrogen containing 1 to 2% oxygen. The patent reports a significant increase in photostimulated luminescence over that of a material prepared by the "conventional" method.

U.S. patent application Ser. No. 08/157,582, filed Nov. 24, 1993 teaches a phosphor which is the Product of firing precursors including an oxo-sulfur reducing agent. U.S. patent application Ser. No. 08/157,583, filed Nov. 24, 1993 teaches an alkaline earth metal fluorobromoiodide storage phosphor that includes potassium. These two patent applications are hereby incorporated herein by reference.

It would be highly desirable to provide a storage phosphor, preparation method, and image storage panel having improved erasability while maintaining high photostimulated luminescence.

SUMMARY OF THE INVENTION

The invention, in its broader aspects provides a storage phosphor, a preparation method, and a storage panel including the inventive phosphor. In the method, a precursor mixture is fired, at a temperature between 700° C. and the melting point of the phosphor, to produce an intermediate product. The precursor mixture comprises a combination of species characterized by the relationship:

$$MFX_{1-z}I_z:uM^aX^a:yA:eQ$$

wherein M is selected from Mg, Ca, Sr and Ba; X is selected from Cl and Br; $M^a$ is selected from Na, K, Rb and Cs; $X^a$ is selected from F, Cl, Br and I; A is selected from Eu, Ce, Sm, and Tb; Q is metal oxide; and $0<z\leq1$; $0<u<1$; $0<y\leq0.1$; and $0<e<0.1$. The intermediate product is then annealed in a slightly oxidizing atmosphere, at a temperature, which is lower than said temperature of firing and between about 400° C. and about 800° C., for a time sufficient to reduce the erase fraction of the resulting phosphor relative to the same phosphor produced by firing in the same manner, but not annealing.

It is an advantageous effect of at least some of the embodiments of the invention that a preparation method, storage phosphor, and image storage panel are provided in which there is a reduction in erase fraction.

DESCRIPTION OF PARTICULAR EMBODIMENTS

In the method of the invention, a precursor mixture for a radiographic storage phosphor is fired at a temperature from about 700° C. to 1100° C. or higher and then annealed at a lower temperature, from about 400° C. to about 800° C., in a slightly oxidizing atmosphere. The annealing is continued for a time sufficient to reduce the erase fraction (EF) of the resulting phosphor relative to the same phosphor produced without annealing. In a preferred embodiment of the invention, the resulting phosphor also has a photostimulated luminescence response (PSL or PSL response) that approximates or improves on the response of the same phosphor produced without annealing. Specific procedures used herein for measuring EF and PSL are described below.

The precursor mixture has species having the relative proportions represented in Equation I:

$$MaFXa_{1-z}I_z:uM^bX^b:yA:eQ \qquad (I)$$

where $M^a$ is selected from Mg, Ca, Sr and Ba; $X^a$ is selected from Cl and Br; $M^b$ is selected from Na, K, Rb and Cs; $X^b$ is selected from F, Cl, Br and I; A is selected from Eu, Ce, Sm, and Tb; and Q is metal oxide; and $0<z\leq1$; $0<u<1$; $0<y\leq0.1$; and $0.00001<e<0.1$. The same designations appearing elsewhere herein have the same meanings unless specifically stated to the contrary. Grouped species, for example the species defined by $X^a$, are to be understood as inclusive of combinations of species in that group.

The precursor mixture is prepared by mixing ingredients of appropriate stoichiometry. The mixing may be provided by any convenient means, for example, grinding in a mortar; however, it is preferred that the components be mixed as a solution or suspension in distilled water. The precursor components can be dissolved in a common solvent, followed by stirring until a digestion/precipitation reaction occurs forming a precursor to the phosphor. The precursor, depending upon the conditions of the reaction, may be a mixture of the starting components, but can be, for example, a host lattice with Eu in the +3 oxidation state. In this example firing drives Eu to the +2 oxidation state. The advantage of the solution/suspension method is that the components of the phosphor are distributed in a very intimate mixture.

After the solution or suspension is prepared, the water is removed to obtain a dry cake. The removal of the water is preferably carried out at moderate temperature, room temperature to about 200° C. The water contained in the suspension may be removed by a number of methods including thermal drying, drying under a vacuum or reduced pressure, spray drying, or drying in a microwave oven. In the latter technique, the suspension is placed in a conventional microwave oven and "cooked" in the same manner as a food item, that is, the microwave oven is adjusted to remove water at a reasonable rate, while maintaining a relatively even temperature in the phosphor intermediate. The phosphor intermediate may be rotated periodically or continuously, as necessary, to help reduce temperature variations. The process is continued until the phosphor intermediate has the form of a dry, white cake. The different drying procedures, and variations in those procedures, can result in differences in the phosphor produced. Drying procedures may be optimized using the results achieved by microwave drying (also referred to herein as "microwave dryness") as a benchmark for a preferred phosphor.

The resulting cake is then pulverized by use of a mortar or other means. The finely pulverized product is then placed in a heat-resistant container such as a quartz boat, an alumina crucible or a quartz crucible, and then fired.

The firing temperature is from about 700° C. to a temperature approaching the melting point of the phosphor product (typically 1100° C. or higher). Within these limits, selection of firing temperature and heating and cooling ramps are a matter of convenience and the decomposition requirements of the precursor materials. If the starting materials include a flux, the firing can be at a lower temperature than might otherwise be suitable. Potassium salts capable of decomposing to the corresponding oxide at temperatures up to about 1000° C. are particularly useful as fluxing agents. The other metals can also, if desired, be initially provided in the form of salts capable of being thermally decomposed to the corresponding oxides. Nitrate, chloride, carbonate and carboxylate salts are all specifically contemplated as starting materials. A currently preferred firing temperature range is from 750° C. to 950° C., a currently more preferred range is from 800° C. to 950° C.

The firing period is determined depending upon the amount of the mixture of the starting materials charged into the heat resistant container, the firing temperature, etc., and generally ranges from 0.5 to 12 hours. Annealing can proceed immediately after firing without an intermediate cooling step or the intermediate phosphor product can be cooled and then heated to the annealing temperature.

The method of the invention does not mandate that a particular atmosphere be present during the firing step. The firing atmosphere can be inert gas. The term "inert" is used here to refer to true inert gases, such as helium and neon and other gases that are functionally inert as used in the method of the invention, such as nitrogen. The atmosphere can also be reactive. For example, if organic compounds or ions are present in the precursor mixture, then a carbon dioxide atmosphere can be utilized during firing for the purpose of helping to volatilize residual carbon. An excessively reactive atmosphere is not desirable. An atmosphere is excessively reactive if it causes degradation of the characteristics of the phosphor produced so as to render the phosphor unusable or outside the scope of the claimed invention.

In a preferred embodiment of the invention, the atmosphere during firing is slightly oxidizing with the remainder inert gas. A suitable slightly oxidizing atmosphere is inert gas doped with about 10 to about 200 parts per million (ppm) of oxygen. A currently more preferred range is from about 75 to about 125 ppm of oxygen in the inert gas/oxygen mixture.

After firing, the intermediate product is annealed at a temperature from about 400° to 800° C., or more preferably from 500° to 750° C., in a slightly oxidizing atmosphere, for a time sufficient to reduce the erase fraction (EF) relative to the same phosphor produced without annealing. In a preferred embodiment of the invention, the reduction in erase fraction is accompanied by a depletion of iodide relative to the iodide concentration of the precursor mixture.

Heating and cooling ramps for the annealing step are a matter of convenience. The slightly oxidizing atmosphere has about 10–400 ppm oxygen. Annealing times are from about 0.5 hours to 100 hours. It is expected that annealing times will vary as a function of the oxygen concentration. Exact times and oxygen concentrations most convenient for a particular embodiment of the invention can be simply determined, as a matter of trial and error; by annealing for a short time period, determining the erase fraction, and, as necessary, recommencing the anneal on an iterative basis until a suitable erase fraction is obtained. Erase fraction (EF) is minimized in the range of about 20 to 125 ppm oxygen.

A reduction in photostimulated luminescence (PSL) is seen in the range of 100 to 400 ppm oxygen. Oxygen concentration can be selected to meet particular requirements as to EF and PSL, such as uniformity with other batches of phosphor.

Times, temperatures within the indicated range, and temperature ramps can be varied considerably to modify EF and PSL or as a matter of convenience. Particular temperature ramps are not required, however, at least in the currently preferred embodiments of the invention, the EF and PSL of the phosphor produced are a function of time at a particular temperature within the range of about 500° to 750° C. Table 2 shows that for a uniform annealing time EF decreases with decreasing anneal temperature, but PSL peaks in the range of 700° to 750° C. A suitable annealing time period is determined by the time necessary to produce a desired result. Since annealing can be continued indefinitely without detrimental results, selection of a minimum time period is simply a trivial matter of working backwards by trial and error from an excess time period. For the specific phosphors disclosed herein, one hour of annealing is suitable.

After annealing, the phosphor particles produced are ground to a particle size suitable for forming the radiographic panels of the invention. Additional processing procedures, well known to those in the art, such as washing, drying, and sieving can be performed as appropriate for a particular use. The median particle size utilized is generally between about 0.5 and about 40 micrometers. A median particle size of between 1 and about 20 micrometers is preferred for ease of formulation, as well as optimizing panel properties, such as speed, sharpness and noise.

The radiographic panels of the invention containing the inventive phosphor are formed by conventional coating techniques where the phosphor powders are mixed with a solution of a resin binder material and coated by means such as blade coating onto a substrate. U.S. Pat. No. 4,505,989, to Umemoto et al, the disclosure of which is hereby incorporated herein by reference, describes suitable techniques known in the art for preparing an X-ray image storage panel.

The phosphors of the present invention can be blended with other phosphors, if desired, to form a panel having optimal properties for a particular application. Panel constructions containing more than one phosphor-containing layer are also possible, with the present phosphors being present in one or more of the phosphor-containing layers.

While it is in theory possible to prepare a luminescent layer that does not contain any ingredient other than the phosphor itself, generally the luminescent layer of a panel contains in addition to phosphor particles a polymeric binder to give structural coherence to the luminescent layer. In general the binders useful in the practice of the invention are those conventionally employed in the art. Binders used in layers of the panel are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful binders are disclosed in U.S. Pat. Nos. 2,502,529; 2,887,379; 3,617,285; 3,300,310; 3,300, 311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. It is preferrable, however, to include a dye or pigment which absorbs some of the stimulating radiation, generally provided by a laser; but mostly reflects emitted light. U.S. Pat. No. 4,491,736, to Teraoka, teaches the use of such materials in a storage panel.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers' and by a rigid plate of aluminum or the like.

Metal layers, such as aluminum, enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

An overcoat, though not required, is commonly located over a storage phosphor layer for humidity and wear protection. In the claimed invention, the overcoat can be chosen using the criteria described above for the binder. The overcoat can be chosen from among the same polymers used to form either the screen binder or the support, with the requirements of toughness and scratch resistance usually favoring polymers conventionally employed for film supports. For example, cellulose acetate is an overcoat commonly used with the poly(urethane) binders. Overcoat polymers are often used also to seal the edges of the phosphor layer. In a preferred embodiment of the invention, the overcoat is produced in accordance with U.S. patent application Ser. No. 08/157,581, filed Nov. 24, 1993, the disclosure of which is hereby incorporated herein by reference.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

For best image definition, when the front panel support and subbing and anticurl layers are transparent, the phosphor layer either contains an absorber or overlies such a layer.

Any one or combination of conventional panel features compatible with the features described herein can, of course, be employed. Conventional storage panel constructions are disclosed in U.S. Pat. No. 4,380,702, to Takahashi et al, the disclosure of which is hereby incorporated by reference. It is currently preferred that the storage panel incorporate an anti-yellowing agent. A suitable such storage panel incorporating an oxosulfur reducing agent is disclosed in U.S. patent application Ser. No. 08/157,796, filed Nov. 24, 1993, the disclosure of which is hereby incorporated herein by reference. Another suitable such storage panel also incorporating an oxosulfur reducing agent is disclosed in U.S. patent application Ser. No. 08/157,797, filed Nov. 24, 1993; the disclosure of which is also hereby incorporated herein by reference.

In some embodiments of the method of the invention, the precursor mixture includes an oxosulfur reducing agent as disclosed in U.S. patent application Ser. No. 08/157,582, filed Nov. 24, 1993; the disclosure of which is hereby incorporated herein by reference. The oxosulfur reducing agent includes a moiety or ion of the general formula $S_jO_k$, where j and k are positive integers such that $0.25 < j/k < 1.0$. Examples of suitable oxosulfur reducing agents include thiosulfates, polythionates, and Bunte compounds having the general structure: $R'SSO_3D$; where R' is a covalently bonded organic substituent and D is the counterion. Counterions (cations) are inorganic or organic and are selected on the basis of convenience and non-interference with the desired characteristics of the phosphor produced. For example, if the phosphor includes a particular alkaline earth metal, the counterion can be selected to be the same element. Alternatively, the counterion can be selected so as to volatilize during firing. An example of the latter is the ammonium ion. The oxosulfur reducing agent is present, in the precursor mixture, in an amount sufficient to increase PSL. It is currently preferred that the oxosulfur reducing agent be present in the precursor mixture, in a molar ratio of sulfur to alkaline earth metal of greater than $1 \times 10^{-4}$ and less than 0.020.

With the exception of the oxosulfur reducing agent for iodine, the exact composition of the unfired precursor can be varied extensively, in terms of both volatile components and selection of individual salts, within limits defined by the composition of the inventive phosphor. Selection of particular components of the unfired precursor which do not alter the composition of the inventive phosphor is largely a matter of convenience. For example, the inventive phosphor can be prepared using the following components or their hydrates:

at least one alkaline earth metal fluoride selected from: $BaF_2$, $CaF_2$, and $SrF_2$;

at least one alkaline earth metal iodide selected from $BaI_2$, $CaI_2$, and $SrI_2$;

at least one alkaline earth metal halide selected from $BaCl_2$, $BaBr_2$, $CaCl_2$, $CaBr_2$, $SrCl_2$, and $SrBr_2$;

at least one trivalent europium-(halide, oxide, nitrate, or sulfate);

at least one transition metal compound selected from compounds of manganese, vanadium, chromium, iron, cobalt, and nickel with halide, oxide, nitrate or sulfate;

at least one oxosulfur reducing agent selected from thiosulfates of barium, cesium, strontium, and ammonium. The claimed invention is not limited by the scope of this example.

The phosphor of the invention is characterized by species having the relative proportions represented by Equation I and has an erase fraction which is lower than that of a comparable phosphor prepared by a method in which the precursor mixture is fired as called for by the method of the invention, but not annealed. The erase fraction of the phosphor of the invention is preferably less than about a third of the erase fraction of the comparable non-annealed phosphor; more preferably, less than about one-quarter; still more preferably, less than about one-tenth.

In a preferred embodiment, the phosphor of the invention is characterized as including oxygen and species having the relationship represented by Equation II:

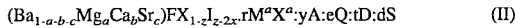

$$(Ba_{1-a-b-c}Mg_aCa_bSr_c)FX_{1-z}I_{z-2x}O_x \cdot rM^aX^a:yA:eQ:tD:dS \quad (II)$$

X is selected from Cl and Br. $M^a$ is selected from Na, K, Rb and Cs. $X^a$ is selected from F, Cl, and Br. A is selected from Eu, Ce, Sm, and Tb. Q is selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$. D is selected from V, Cr, Mn, Fe, Co, and Ni. The numerical designations represent the following: a+b+c is from 0 to 0.4; z is from $1 \times 10^{-2}$ to 1; x is from $1 \times 10^{-4}$ to $1 \times 10^{-2}$; r is from 0 to 0.1; y is from $1 \times 10^{-4}$ to 0.1; e is from 0 to 0.1; t is from 0 to $10^{-2}$; and d is from 0 to 0.020. In a particular embodiment of the invention, X is Br, A is Eu, Q is $Al_2O_3$ or $SiO_2$, a+b +c is from 0 to 0.04, z is from 0.05 to 0.5, r is from $10^{-4}$ to 0.01, y is from $1 \times 10^{-4}$ to 0.1, e is from 0 to 0.01, and t is from 0 to $1 \times 10^{-2}$. In that embodiment, the sulfur present in the phosphor is due to inclusion in the precursor mixture of an oxosulfur reducing agent, as above discussed.

The phosphor represented by Equation II is produced from a precursor mixture characterized by Equation III:

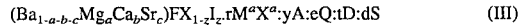

$$(Ba_{1-a-b-c}Mg_aCa_bSr_c)FX_{1-z}I_z \cdot rM^aX^a:yA:eQ:tD:dS \quad (III)$$

Designations have the same meanings as in Equation II. The phosphor of the invention of Equation II differs in stoichiometry from its solid starting materials, (Equation III) and from a phosphor produced from the same precursor mixture by a method in which the precursor mixture is fired as called for by the method of the invention, but not annealed (referred to hereafter as "non-annealed phosphor" and also represented by Equation III). Notably, Equation II is not balanced as to charge. The concentration of iodine atoms is decreased in the phosphor of the invention relative to a non-annealed phosphor (under the same conditions). This decrease is non-stoichiometric relative to the alkaline earth metal concentration. The concentration of bromine atoms is substantially unchanged.

These results strongly correlate with a conclusion that, in the method of the invention, the decrease in concentration of iodine atoms reflects a depletion of iodide that occurs as a result of a reaction with oxygen introduced by the method of the invention. These results further correlate with a conclusion that the reaction with oxygen occurs substantially in accordance with the following equation (expressed in terms of a simplified example in which a, b, c, r, e, t, and d in Equation II each equal 0 and A equals Eu):

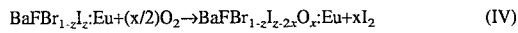

$$BaFBr_{1-z}I_z:Eu+(x/2)O_2 \rightarrow BaFBr_{1-z}I_{z-2x}O_x:Eu+xI_2 \quad (IV)$$

Each incorporation of oxide ion ($O^{2-}$) nominally requires the loss of two iodide ions and the creation of an anion vacancy. These two species in combination with $Eu^{2+}$, have been described in R. S. Eachus, et al, "Radiation produced electron and hole centers in oxygen containing BaFBr: An ENDOR Study of $O_F^-$", J. Phys. Condensed Matter, Vol. 3, (1991), p. 327; as the spatially correlated triplet center responsible for photostimulated storage in barium fluorobromide type phosphors. Taking Equation IV into account, Equation II can be rewritten as the balanced equation:

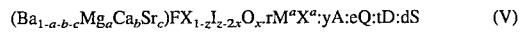

$$(Ba_{1-a-b-c}Mg_aCa_bSr_c)FX_{1-z}I_{z-2x}O_x \cdot rM^aX^a:yA:eQ:tD:dS \quad (V)$$

Variables in Equation V, including x, have the same meaning as in Equation II. The phosphor of the invention is thus believed to include a specific and relatively small portion of oxygen, within the matrix of the phosphor, that is not present in the non-annealed product. This small portion of oxygen is in addition to oxygen present in the oxide Q (if y≠0). This small portion of oxygen is also in addition to oxygen that may be present as a contaminant along grain boundaries, within voids in agglomerates, and the like; but is not incorporated into the phosphor matrix so as to displace iodine atoms. The oxygen introduced into the phosphor via the method of the invention is considered to be fundamentally different than oxygen introduced as an impurity or in the form of an oxide. Oxygen introduced by the method of the invention appears to be directly incorporated into the phosphor lattice so as to play an important role in the storage mechanism of the phosphor. Oxygen introduce as an impurity or oxide does not appear to play the same role.

The phosphor of the invention can also be characterized on the basis of its luminescence and Raman spectra. An embodiment of the phosphor of the invention disclosed in the examples had luminescence peaks, upon excitation by a 514.5 nm laser beam, at 573.4, 576.1, 580.8, 590.2, 611.7, 616.5, 630.6 nm (all ±0.5 nm). The comparable non-annealed phosphor exhibited only a small peak at 573.4 nm±0.5 nm. Raman peaks were also changed for the phosphors of this embodiment of the invention. Peaks at 99, 106, 121, 209, and 235 $cm^{-1}$ exhibited a decrease in area relative to the corresponding peaks for the non-annealed phosphor.

A currently preferred embodiment of the phosphor of the invention exhibits a luminescence peak, upon excitation by a 514.5 $Ar^+$ laser beam, at 573.4 nm ±0.5nm, that has a peak area from about two to ten times the peak area at the same wavelength for the non-annealed phosphor. The phosphor of this embodiment of the invention also exhibits an improved erase fraction relative to the non-annealed phosphor and a photostimulated luminescence that is substantially the same as or moderately reduced from the PSL of the non-annealed phosphor.

Although not fully understood, a hypothetical explanation for the method of the invention can be proposed. The scope of the invention is not, however, limited by any theory or explanation.

It can be proposed that, at temperatures exceeding 800° C., oxide ions ($O^{2-}$) and anion vacancies (V) dissociate. Possible mechanisms include diffusion of the two species away from each other, or, alternatively, a pathway involving the ionization of $O^{2-}$:

$$O^{2-} \rightarrow O^- + e^-$$

followed by loss of the electron to the conduction band or reduction of $Eu^{3+}$:

$$Eu^{3+} + e^- \rightarrow Eu^{2+}$$

The ionization of $O^{2-}$ would aid the dissociation of the oxygen ion and vacancy species, because there would no longer be a strong coloumbic attraction between the two species; $O^{2-}$ is neutral to the (−1) anion lattice, whereas the $O^{2-}$ ion is (−) with respect to the lattice and would be tightly bound to the V site which is (+) with respect to the lattice. The result of the ionization of $O^{2-}$ would be a significant reduction in the barrier to randomization. Furthermore, the ionization of oxide ion ($O^{2-}$) leads to the formation of dioxygen ($O_2$) according to the reaction:

$$2O^{2-} \rightarrow O_2 + 4e^-$$

Loss of dioxygen from the matrix would occur, due to the high volatility of dioxygen. The result would be a reduction in spatially correlated triplet centers. The decrease in spatially correlated $O_{2-}-V-Eu^{2+}$ triplet centers is expressed as the observed residual signal remaining after a standard erase procedure.

Quenching (rapid cooling) freezes the concentration and randomized distribution of oxygen ions and vacancies. Annealing in a slightly oxidizing atmosphere, serves to increase or maintain the oxide concentration and to reassociate the $O^{2-}$ and V centers, increasing the spatial correlation of $O^{2-}-V-Eu^{2+}$ triplet centers. This could proceed through a reverse diffusion of the species or by the capture of an electron by $O^-$ to regenerate $O^{2-}$. The coloumbic attraction between $O^{2-}$ and V would then drive the correlation of these species. This hypothesis supports a role of oxygen in the method of the invention to either: 1) increase the number of $O^{2-}$ ions available to associate with vacancies or 2) create additional vacancies available for association with existing $O^{2-}$ ions in the phosphor.

The following Examples and Comparative Examples are presented to further illustrate and elucidate some preferred modes of practice of the invention.

Unless otherwise indicated, all starting materials were commercially obtained. In order to reduce experimental variability, Examples and their Comparative Examples (as indicated by the groupings in the tables below) were run at the same time.

Image storage panels were not prepared, but could be prepared, for example, by the following general procedure. The phosphors would be dry ball-milled using alumina beads to obtain a phosphor particle size suitable for radiography. The final particle size distribution of the phosphor would be about 1 to 25 micrometers with a median near 8 micrometers. The phosphors would be dispersed in a 13% (weight/weight) solution of Permuthane U-6366 polyurethane marketed by ICI Polyurethanes Group of West Deptford, N.J. dissolved in 93:7 (weight/weight) dichloromethane/methanol solvent. The phosphor to binder ratio would be 15:1 by weight. Knife-coatings would be prepared on a polyethylene terephthalate support, and allowed to air-dry to produce storage panels. After drying the panels would be overcoated with a polymer solution of cellulose acetate in acetone.

The relative photostimulated luminescence (PSL) intensities of the phosphor powders were measured by packing the powders in aluminum planchettes (2 mm high×24 mm in diameter), and simultaneously exposing the sample and a standard to unfiltered X-radiation. The X-ray source was a tungsten target tube operating at 15 kVp and 3.0 mA. After exposure to X-rays, the samples and standard were stimulated with a 4-millisecond pulse from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses for a particular sample are reported relative to a standard; the response of the standard was arbitrarily set =100.

Following the measurement of relative PSL, erasability was measured by re-exposing the samples for 5 minutes with the same X-ray source as described above. The samples and standards were then placed under an erase lamp and subjected to light having a wavelength within or near the region of stimulation of the phosphor for 15 seconds. The erase lamp was a broad band fluorescent lamp marketed by Aristo Grid Inc., of Roslyn, N.Y. as Model No. MTC-1696. Both erase procedures are equivalent. The residual signal in the samples was then determined by stimulation with the helium-neon laser as described above. A relative residual signal was obtained by normalizing the sample residual to that of the internal standard (set to 1.0). Under the conditions described above, the internal sample shows a residual signal of $9 \times 10^{-4}$ of the original PSL signal. The "erase fraction" of the sample is then defined as:

$$EF_{sample} = \frac{\text{(relative sample residual signal)}}{\text{(relative sample } PSL\text{)}} \times 100$$

Erase fractions below 1.0 represent an improvement in erasability relative to the internal standard.

Oxygen concentrations were measured using an AMETEK TM-1B oxygen analyser at a constant flow rate through the analyser of 150 cc/min. The concentrations are reported in parts by weight of oxygen per million Parts by weight of inert gas.

COMPARATIVE EXAMPLE 1

$Ba_{0.995}Ca_{0.005}FBr_{0.85}I_{0.15}:0.001Eu^{2+}$, 0.0008 KBr phosphor was prepared as follows. Into a 2000 ml beaker containing a Teflon coated magnetic stir bar, 269.54 grams of $BaBr_2 \cdot 2H_2O$ and 62.22 grams of $BaI_2 \cdot 2H_2O$ were dissolved in a 2 to 3 fold excess of distilled water and the solution filtered. To the filtered solution was then added 2.88 grams of fumed silica and 0.500 g of $BaS_2O_3 \cdot H_2O$ followed by 0.088 grams of KBr. $BaF_2$ (175.33 grams, containing 0.002 moles of $EuF_2$ and 0.01 moles of $CaF_2$) was then added to the solution slowly with vigorous stirring, forming a white slurry. The slurry was then dried to microwave dryness forming a cake of phosphor precursor mixture.

The phosphor precursor mixture was then placed into alumina containers and fired in a tube furnace at 850° C. for 2.5 hours under a stream of pure inert gas (nitrogen or argon), removed from the furnace and allowed to cool in the same atmosphere. The fired phosphor was then ground and sieved through a 38 micrometer mesh.

Photostimulated luminescence and erasability were measured as above-described. Results are given in Table 1.

COMPARATIVE EXAMPLES 2–3

Storage phosphors were prepared and evaluated as described in Comparative Example 1, with the exception that oxygen was included in the firing atmosphere, at the relative concentrations indicated in Table 1. Results are given in Table 1.

COMPARATIVE EXAMPLE 4

Storage phosphor was prepared and evaluated as described in Comparative Example 1, with the exception that instead of firing the phosphor precursor mixture in the manner described in Comparative Example 1, the phosphor precursor mixture was fired and annealed as follows. The phosphor precursor was placed in alumina containers and heated at 850° C. for 2 hours, after which the furnace was cooled at a constant rate of 165° C./hr to 600° C. and held there for 1 hour. The phosphors were then removed from the furnace and allowed to cool. At all times, from heating through cooling, the atmosphere was inert gas (nitrogen or argon).

Raman and luminescent spectra were obtained for the phosphor powders using for excitation, a 514.5 nm light beam produced by a 200 mW $Ar^+$ laser. A sample of the phosphor powder was contained in a glass melting point capillary. The optical spectra were collected at 90 degrees relative to the incident laser beam using a SPEX 1403 scanning double monochromator spectrometer. The photomultiplier tube of the specrometer was set to −1700 volts. Raman spectra were acquired by scanning from 75 to 300 $cm^{-1}$ in 1.0 $cm^{-1}$ increments at 2.0 second integration time with the slits of the spectrometer set to 200/280/280/200 micrometers. Luminescence spectra were acquired by scanning from 1900 to 4000 $cm^{-1}$ in 2.0 $cm^{-1}$ increments at 3.0 second integration time with the slits set to 400/480/480/400 micrometers. The spectra, acquired in units of "Raman shifted wavenumbers", were mathematically converted to absolute frequency and wavelength using GRAMS/386 software. Peak areas were determined by integrating the area bound by the Raman or luminescence band and a baseline created by deleting peaks from the spectrum and then filling in missing segments with straight or uniformly curved lines.

The iodide and bromide content of the phosphor was determined by neutron activation analysis. Potassium bromide (99,999% KBr) and potassium iodate 99,999% $KIO_3$) were used as standards for bromide and iodide, respectively. All samples were analyzed in triplicate. Relative iodide concentrations were also determined by powder X-ray diffraction by assuming a Vegard's Law relationship with unit cell volume. The two techniques were in good agreement: ±10%. The analyses reveal a loss of iodide upon firing in an increasingly oxidizing atmosphere. Oxygen concentrations were then determined through mass balance according to the Equation IV. The sample prepared in an atmosphere containing 0 ppm oxygen was assumed to be oxide free.

Results are presented in Tables 1 and 5.

EXAMPLES 1–6

Storage phosphor was prepared and evaluated as described in Comparative Example 4, with the exception that the atmosphere was inert gas (nitrogen or argon) including oxygen in the respective concentrations indicated in Table 1. Raman and luminescence spectra were obtained for the phosphor of Examples 2 and 5 in substantially the same manner as in Comparative Example 4. Luminescence peaks were noted at 573.4, 576.1, 580.8, 590.2, 611.7, 616.5, 630.6 nm (all ±0.5 nm). Results are presented in Tables 1 and 5.

EXAMPLES 7–12

Storage phosphor was prepared and evaluated as described in Examples 1–6, with the exception that instead of firing and annealing the phosphor precursor mixture in the manner described in Examples 6–13, the phosphor precursor mixture was fired and annealed as follows. Portions of the precursor material mixture were placed in aluminum containers and fired in a tube furnace as follows: samples were held at 850° C. for 2 hours and the furnace cooled at a rate of 156° C./hr to the respective anneal temperature specified in Table 2. The anneal temperature was then maintained for 1 hour after which the sample was allowed to cool. Firing, annealing, and cooling were all performed under a flow of nitrogen containing 53 ppm oxygen. The total gas flow rate was 4.0 liters/min. Results are given in Table 2.

COMPARATIVE EXAMPLES 5

Storage phosphor was prepared and evaluated as described in Examples 7–12, except for the respective anneal temperatures specified in Table 2. Results are given in Table 2.

COMPARATIVE EXAMPLE 6

Storage phosphor was prepared and evaluated as described in Examples 1–6, with the exception that instead of firing and annealing the phosphor precursor mixture in the manner described in Examples 1–6, the phosphor precursor mixture was fired and annealed as follows. Phosphor samples of 8 grams were placed into alumina crucibles and loaded in a 3 inch tube furnace. The system was purged 30 minutes with a 3.0 lpm flow of nitrogen (>99.999% purity). The temperature was then increased to 770° C. in 60 minutes under the constant 3.0 lpm nitrogen flow, and held at this temperature for 96 minutes. The samples were then cooled to 250° C. in about 100 minutes, and then pulled to a cool zone of the tube. After 30 minutes in the cool zone under the nitrogen flow, the same samples were then reloaded into the tube furnace and treated as above, with the exceptions of 1) a 3.0 liters per minute (lpm) flow of nitrogen containing 1.5 weight percent oxygen was used, and 2) the final firing temperature was 900° C. The resulting ingot was ground to a powder in an agate mortar and pestle, and evaluated for relative PSL and erase fraction. The results are given in Table 3.

X-ray powder diffraction was conducted on a sample of the phosphor. Results were consistent with the presence of $BaF_2$ as an impurity phase in a matrix of BaFX (relatively enriched as to iodine). This is consistent with the relatively low PSL seen for the phosphor.

EXAMPLE 13

Storage phosphor was prepared and evaluated as in Example 8. All equipment was the same as in Comparative Example 5. Results are reported in Table 3.

COMPARATIVE EXAMPLE 7

Storage phosphor was prepared and evaluated as in Comparative Example 6, except that amounts of starting materials were adjusted appropriately to prepare BaFBr:0.001Eu. Results are reported in Table 3.

EXAMPLE 14

Storage phosphor were prepared and evaluated as in Example 13, except that amounts of starting materials were adjusted appropriately to prepare BaFBr:0.001Eu. Results are reported in Table 3.

EXAMPLE 15

Storage phosphor was prepared in substantially the same manner as in Examples 1–6, with the exception that the amount of oxygen added to the inert gas was 75 ppm. Results are reported in Table 4.

EXAMPLE 16

Storage phosphor was prepared as in Example 15, with the exception that only inert gas (nitrogen or argon) was used during firing and an atmosphere containing 75 ppm of oxygen was added during annealing. Results are reported in Table 4.

COMPARATIVE EXAMPLE 8

Storage phosphor was prepared in substantially the same manner as in Examples 15–16, except that an atmosphere containing 75 ppm of oxygen was added during firing and only inert gas (nitrogen or argon) was added during annealing. Results are reported in Table 4.

TABLE 1

Barium fluorobromoiodide phosphor
$(Ba_{0.995}Ca_{0.005}FBr_{0.85}I_{0.15-2x}O_x: 0.001EU^{2+}, 0.0008KBr)$
prepared with and without annealing and oxygen doping.

| Ex. or Comp. Ex. | Annealed | $O_2$ conc. (ppm) | PSL | EF | Value of x |
|---|---|---|---|---|---|
| Comp. Ex. 1 | No | 0 | 162 | 0.72 | — |
| Comp. Ex. 2 | No | 65 | 162 | 0.51 | — |
| Comp. Ex. 3 | No | 200 | 158 | 0.49 | — |
| Comp. Ex. 4 | Yes | 0 | 160 | 0.63 | 0 |
| Ex. 1 | Yes | 30 | 163 | 0.05 | — |
| Ex. 2 | Yes | 50 | 160 | 0.05 | 0.0038 |
| Ex. 3 | Yes | 80 | 164 | 0.01 | — |
| Ex. 4 | Yes | 110 | 152 | 0.02 | 0.0054 |
| Ex. 5 | Yes | 240 | 136 | 0.06 | — |
| Ex. 6 | Yes | 370 | 125 | 0.08 | 0.0062 |

TABLE 2

Barium fluorobromoiodide phosphor prepared using different anneal temperatures.

| Example or Comparative Example | Anneal temperature (°C.) | PSL | Erase fraction |
|---|---|---|---|
| Example 7 | 550 | 162 | 0.00 |
| Example 8 | 600 | 185 | 0.00 |
| Example 9 | 650 | 191 | 0.02 |
| Example 10 | 700 | 197 | 0.07 |
| Example 11 | 750 | 197 | 0.11 |
| Example 12 | 800 | 186 | 0.14 |
| Comp. Ex. 5 | 850 | 187 | 0.55 |

TABLE 3

Barium fluorobromoiodide and barium fluorobromide phosphors secondarily fired to 900° C. in 1.5 wt. % oxygen atmosphere (2nd fired) and fired and annealed by the method of the invention (invention).

| Ex. or Comp. Ex. | Precursor mixture composition (all doped with 0.001Eu) | Prep. Method | PSL | EF |
|---|---|---|---|---|
| Comp. Ex. 6 | $BaFBr_{0.85}I_{0.15}$ | 2nd fired | 0 | — |
| Ex. 13 | $BaFBr_{0.85}I_{0.15}$ | invention | 179 | 0.01 |
| Comp. Ex. 7 | BaFBr | 2nd fired | 5 | 13.8 |
| Ex. 14 | BaFBr | invention | 29 | 0.04 |

TABLE 4

Barium fluorobromoiodide phosphor prepared with the addition of 75 ppm oxygen to the atmosphere at indicated times.

| Example or Comparative Example | When $O_2$ added | PSL | Erase fraction |
|---|---|---|---|
| Ex. 15 | $O_2$ during annealing and firing | 156 | 0.04 |
| Ex. 16 | $O_2$ only during annealing | 129 | 0.06 |
| Comp. Ex. 8 | $O_2$ only during firing | 168 | 0.26 |

TABLE 5

Luminescence spectra upon excitation with a laser beam at 514.5 nm.

| | Wavelength in nm | |
|---|---|---|
| Example or Comparative Example | 573.4 | 630.6 |
| Comparative Example 4 | 193 | 0 |
| Example 2 | 469 | 142 |
| Example 5 | 2277 | 1040 |

The preceeding tables evidence the advantages and features of the inventive phosphors, compositions of matter, and panels of the invention.

Table 1 demonstrates the surprising results provided by the invention. Comparative Example 1 shows that a $BaFBr_{1-x}I_x$:Eu phosphor obtained by firing according to a conventional method is characterized by relatively poor erasability. Firing the precursor mixture in a slightly oxidizing atmosphere, but not annealing, Comparative Examples 2–3, provides a small improvement in erase fraction. Annealing in an inert atmosphere, Comparative Example 4, provides a small improvement in erase fraction. The combination of these procedures, firing in a slightly oxidizing atmosphere and annealing in an inert atmosphere, Comparative Example 8, provides little additional improvement in erase fraction.

The Examples, in contrast, demonstrate that the method of the invention provides a surprisingly large improvement in erase fraction, while providing good PSL response. Good results were obtained when the firing stream had between about 10 and 150 ppm oxygen doping. With $O_2$ doping, optimum values for PSL and EF coincided. The data of Table 2 show that the PSL and erase fraction are dependent upon the anneal temperature, but the optimums for PSL and EF differ. Table 3 demonstrates that phosphors prepared by the present method are superior to phosphors prepared with a second high temperature firing in a relatively high concentration of oxygen. This is true for both PSL and erasability.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing a storage phosphor comprising the steps of:

firing, at a temperature greater than 700° C., a combination of species including species characterized by the relationship:

$$MFX_{1-z}I_z.uM^aX^a:yA:eQ$$

wherein

M is selected from Mg, Ca, Sr and Ba, and combinations thereof;

X is selected from Cl and Br, and combinations thereof;

$M^a$ is selected from Na, K, Rb and Cs, and combinations thereof;

$X^a$ is selected from F, Cl, Br and I, and combinations thereof;

A is selected from Eu, Ce, Sin, and Tb, and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof; and $0<z<1$;
$0<u<1$;
$0<y<0.1$; and
$0<e<0.1$ to produce an intermediate product; and annealing said intermediate product in a slightly oxidizing atmosphere and at a temperature lower than said temperature of said firing and between about 400° C. and about 800° C., for a time sufficient to reduce the erase fraction (EF) relative to the same phosphor produced without said annealing.

2. The method of claim 1 wherein said slightly oxidizing atmosphere has from about 10 to about 200 parts per million of oxygen.

3. The method of claim 1 wherein said firing is in an atmosphere has from about 10 to about 125 parts per million of oxygen.

4. The method of claim 1 wherein said annealing is at a temperature from about 500° to about 750° C.

5. The method of claim 1 wherein said firing is at a temperature from about 750° to about 950° C.

6. The method of claim 1 wherein said firing is at a temperature from about 800° to about 950° C.

7. The method of claim 1 wherein said slightly oxidizing atmosphere has from about 75 to about 125 parts per million of oxygen.

8. The method of claim 1 wherein said annealing is for a time period of from about 0.5 to about 100 hours.

9. The method of claim 1 wherein said firing and said annealing are each in an atmosphere having from about 10 to about 125 parts per million of oxygen.

10. A method for preparing a storage phosphor comprising the steps of:

firing, at a temperature greater than 700° C., a combination of species is characterized by the relationship:

$$(Ba_{1-a-b-c}Mg_aCa_bSr_c)FX_{1-z}I_z.rM^aX^a:yA:eQ:tD:dE$$

wherein

X is selected from the group consisting of Cl and Br, and combinations thereof;

$M^a$ is selected from the group consisting of Na, K, Rb and Cs, and combinations thereof;

$X^a$ is selected from the group consisting of F, Cl, and Br, and combinations thereof;

A is selected from the group consisting of Eu, Ce, Sin, and Tb, and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof;

D is selected from the group consisting of V, Cr, Mn, Fe, Co, and Ni, and combinations thereof;

E is an oxosulfur reducing agent selected from the group consisting of compounds and salts having a moiety or ion of the general formula $S_jO_k$, where j and k are positive integers such that $0.25<j/k<1.0$, and combinations thereof;

a+b+c is from 0 to 0.4;

z is from $1\times10^{-2}$ to 1;

r is from $1\times10^{-6}$ to 0.1;

y is from $1\times10^{-4}$ to 0.1;

e is from $1\times10^{-5}$ to 0.1;

t is from 0 to $10^2$; and d is from 0 to 0.020 to produce an intermediate product; and annealing said intermediate product in a slightly oxidizing atmosphere and at a temperature lower than said temperature of said firing and between about 400° C. and about 800° C., for a time sufficient to reduce the erase fraction (EF) relative to the same phosphor produced without said annealing.

11. A method for preparing a storage phosphor comprising the steps of:

firing, at a temperature greater than 700° C., a combination of species is characterized by the relationship:

$$(Ba_{1-a-b-c}Mg_aCa_bSr_c)FBr_{1-z}I_z.rM^aX^a:yEu:eQ:dE$$

wherein $M^a$ is selected from the group consisting of Na, K, Rb and Cs, and combinations thereof;

$X^a$ is selected from the group consisting of F, Cl, and Br, and combinations thereof;

Q is selected from the group consisting of $Al_2O_3$ and $SiO_2$, and combinations thereof.;

E is an oxosulfur reducing agent selected from the group consisting of compounds and salts having a moiety or ion of the general formula $S_jO_k$, where j and k are positive integers such that $0.25<j/k<1.0$, and combinations thereof;

a+b+c is from 0 to 0.04;

z is from 0.05 to 0.5;

r is from $10^{-4}$ to 0.01;

y is from $1\times10^{-4}$ to 0.1;

e is from $1\times10^{-5}$ to 0.01; and d is from $1\times10^{-4}$ to 0.020 to produce an intermediate product; and annealing said intermediate product in a slightly oxidizing atmosphere and at a temperature lower than said temperature of said firing and between about 400° C. and about 800° C., for a time sufficient to reduce the erase fraction (EF) relative to the same phosphor produced without said annealing.

12. A method for preparing a storage phosphor comprising the steps of:

firing, in an atmosphere of inert gas and from 0 to about 200 parts per million of oxygen, at a temperature from about 750° C. to about 950° C., combination of species is characterized by the relationship:

$$(Ba_{1-a-b-c}Mg_aCa_bSr_c)FX_{1-z}I_z \cdot rM^aX^a:yA:eQ:tD:dE$$

wherein

X is selected from the group consisting of Cl and Br, and combinations thereof;

$M^a$ is selected from the group consisting of Na, K, Rb and Cs, and combinations thereof;

$X^a$ is selected from the group consisting of F, Cl, and Br, and combinations thereof;

A is selected from the group consisting of Eu, Ce, Sm, and Tb, and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof;

D is selected from the group consisting of V, Cr, Mn, Fe, Co, and Ni, and combinations thereof;

E is an oxosulfur reducing agent selected from the group consisting of compounds and salts having a moiety or ion of the general formula $S_jO_k$, where j and k are positive integers such that $0.25<j/k<1.0$, and combinations thereof;

a+b+c is from 0 to 0.4;

z is from $1\times10^{-2}$ to 1;

r is from $1\times10^{-6}$ to 0.1;

y is from $1\times10^{-4}$ to 0.1;

c is from $1\times10^{-5}$ to 0.1;

t is from 0 to $10^{-2}$; and d is from 0 to 0.020 to produce an intermediate product; and annealing said intermediate product, in an atmosphere of inert gas and from about 10 to about 200 parts per million of oxygen, at a temperature lower than said temperature of said firing and between about 400° C. and about 800° C., for a time sufficient to deplete iodide relative to the iodide concentration of said combination of species.

13. The method of claim 12 wherein said annealing is for a time sufficient to deplete iodide to the extent of from $2\times10^{-4}$ to $2\times10^{-2}$ iodide atoms depleted per formula weight of said combination of species.

14. An annealed storage phosphor consisting essentially of oxygen and a combination of species characterized by the relationship:

$$(Ba_{1-a-b-c}Mg_aCa_bSr_c)FX_{1-z}I_{z-2x} \cdot rM^aX_a:yA:eQ:tD:dS$$

wherein

X is selected from the group consisting of Cl and Br, and combinations thereof;

$M^a$ is selected from the group consisting of Na, K, Rb and Cs, and combinations thereof;

$X^a$ is selected from the group consisting of F, Cl, and Br, and combinations thereof;

A is selected from the group consisting of Eu, Ce, Sm, and Tb, and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof;

D is selected from the group consisting of V, Cr, Mn, Fe, Co, and Ni, and combinations thereof;

a+b+c is from 0 to 0.4;

z is from $1\times10^{-2}$ to 1;

x is from $1\times10^{-4}$ to $1\times10^{-2}$;

r is from 0 to 0.1;

y is from $1\times10^{-4}$ to 0.1;

e is from $1\times10^{-5}$ to 0.1;

t is from 0 to $10^{-2}$; and d' is from 0 to 0.020.

15. The phosphor of claim 14 further characterized as the product of:

(1) firing at a temperature between about 750° C. and about 950° C. a combination of species characterized by the relationship:

$$(Ba_{1-a-b-c}Mg_aCa_bSr_c)FX_{1-z}I_z \cdot rM^aX^a:yA:eQ:tD:dE$$

wherein X, $M^a$, $X^a$, A, Q, D, a, b, c, z, r, y, e, and t have the same meanings as in claim 14, E is an oxosulfur reducing agent selected from the group consisting of compounds and salts having a moiety or ion of the general formula $S_jO_k$, where j and k are positive integers such that $0.25<j/k<1.0$, and combinations thereof, and d is from 0 to 0.020;

to produce a fired product; and (2) annealing said fired product in an atmosphere having from about 10 to about 200 parts per million of oxygen at a temperature lower than said temperature of said firing and between about 500° C. and about 750° C., for a time sufficient to reduce the erase fraction of resulting said storage phosphor relative to the erase fraction of a storage phosphor produced by said firing and without said annealing.

16. A storage phosphor consisting essentially of a combination of species characterized by the relationship:

$(Ba_{1-a-b-c}Mg_aCa_bSr_c)FX_{1-z}I_{z-2x}O_x \cdot rM^aX^a{:}yA{:}eQ{:}tD{:}d'S$ wherein
- X is selected from the group consisting of Cl and Br, and combinations thereof;
- $M^a$ is selected from the group consisting of Na, K, Rb and Cs, and combinations thereof;
- $X^a$ is selected from the group consisting of F, Cl, and Br, and combinations thereof;
- A is selected from the group consisting of Eu, Ce, Sm, and Tb, and combinations thereof;
- Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof;
- D is selected from the group consisting of V, Cr, Mn, Fe, Co, and Ni, and combinations thereof;
- a+b+c is from 0 to 0.4;
- z is from $1 \times 10^{-2}$ to 1;
- x is from $1 \times 10^{-4}$ to $1 \times 10^{-2}$;
- r is from 0 to 0.1;
- y is from $1 \times 10^{-4}$ to 0.1;
- e is from 0 to 0.1;
- t is from 0 to $10^{-2}$; and
- d is from 0 to 0.020.

17. The storage phosphor of claim 16 further characterized as consisting essentially of a combination of species characterized by the relationship:

$(Ba_{1-a-b-c}Mg_aC_bSr_c)FBr_{1-z}I_{z-2x}O_x \cdot rM^aX^a{:}yA{:}eQ{:}tD{:}d'S$ wherein
- $M^a$ is selected from the group consisting of Na, K, Rb and Cs, and combinations thereof;
- $X^a$ is selected from the group consisting of F, Cl, and Br, and combinations thereof;
- A is selected from the group consisting of Eu, Ce, Sm, and Tb, and combinations thereof;
- Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;
- D is selected from the group consisting of V, Cr, Mn, Fe, Co, and Ni, and combinations thereof;
- a+b+c is from 0 to 0.04;
- z is from $1 \times 10^{-4}$ to 1;
- x is from $1 \times 10^{-4}$ to $1 \times 10^{-2}$;
- r is from $10^{-6}$ to 0.1;
- y is from $1 \times 10^{-4}$ to 0.1;
- e is from $1 \times 10^{-5}$ to 0.1;
- t is from 0 to $10^{-2}$; and
- d' is from 0 to 0.020.

18. The storage phosphor of claim 17 wherein A is Eu, r is from $10^{-4}$ to 0.01; t is 0; e is 0.01; z is from 0.05 to 0.5; and a and c are 0 and b is from about 0.001 to 0.04.

19. The storage phosphor of claim 16 further characterized as consisting essentially of a combination of species characterized by the relationship:

$(Ba_{1-a-b-c}Mg_aCa_bSr_c)FBr_{1-z}O_{z-2x}O_x \cdot rM^aX^a{:}YEu{:}eQ{:}d'S$ wherein $M^a$ is selected from the group consisting of Na, K, Rb and Cs, and combinations thereof;
$X^a$ is selected from the group consisting of F, Cl, and Br, and combinations thereof;
Q is selected from the group consisting of $Al_2O_3$ and $SiO_2$, and combinations thereof;
a+b+c is from 0 to 0.04;
z is from 0.05 to 0.5;
r is from $10^{-4}$ to 0.01;
y is from $1 \times 10^{-4}$ to 0.1;
e is from $1 \times 10^{-5}$ to 0.01; and
d' is from $1 \times 10^{-4}$ to 0.020.

20. A radiographic image storage panel comprising a support and a fluorescent layer including crystals of said storage phosphor of claim 14, said crystals being capable of absorbing X-ray radiation and emitting longer wavelength electromagnetic radiation in response to stimulating radiation of a third wavelength.

21. A storage phosphor consisting essentially of a combination of species characterized by the relationship:

$(Ba_{1-a-b-c}Mg_aCa_bSr_c)FX_{1-z}I_z \cdot rM^aX^a{:}yA{:}eQ{:}tD{:}d'S$ wherein
- X is selected from the group consisting of Cl and Br, and combinations thereof;
- $M^a$ is selected from the group consisting of Na, K, Rb and Cs, and combinations thereof;
- $X^a$ is selected from the group consisting of F, Cl, and Br, and combinations thereof;
- A is selected from the group consisting of Eu, Ce, Sm, and Tb, and combinations thereof;
- Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof;
- D is selected from the group consisting of V, Cr, Mn, Fe, Co, and Ni, and combinations thereof;
- a+b+c is from 0 to 0.4;
- z is from $1 \times 10^{-2}$ to 1;
- z' is slightly less than z;
- r is from 0 to 0.1;
- y is from $1 \times 10^{-4}$ to 0.1;
- e is from 0 to 0.1;
- t is from 0 to $10^{-2}$; and
- d' is from 0 to 0.020;

said phosphor exhibiting luminescence peaks, upon excitation by a 514.5 nm laser beam, at 573.4, 576.1, 580.8, 590.2, 611.7, 616.5, 630.6 nm (all ±0.5 nm).

22. The phosphor of claim 21 further characterized as the product of:
- maintaining in a slightly oxidizing, slightly reducing, or inert atmosphere at a temperature between about 750° C. and about 950° C. a combination of species substantially characterized by said relationship to produce an intermediate product; and
- annealing said intermediate product in an atmosphere having from about 10 to about 200 parts per million of oxygen at a temperature lower than said temperature of said firing and between about 500° C. and about 750° C., for a time sufficient to reduce the erase fraction of said storage phosphor relative to the same phosphor produced without said annealing.

* * * * *

UNITED STATES PATENT AND TRADEMARK OFFICE
CERTIFICATE OF CORRECTION

PATENT NO. : 5,549,843
DATED       : Aug. 27, 1996
INVENTOR(S) : Kyle E. Smith, et al It is certified that error appears in the above-indentified patent and that said Letters Patent is hereby corrected as shown below:

On title page, item [22] should read as follows:

Filed: Nov. 21, 1994

Signed and Sealed this

Thirty-first Day of December, 1996

Attest:

BRUCE LEHMAN

*Attesting Officer*          *Commissioner of Patents and Trademarks*